United States Patent
Swaggerty et al.

[19]

[11] Patent Number: 6,084,195
[45] Date of Patent: Jul. 4, 2000

[54] SYSTEM AND METHOD FOR MONITORING ELECTRODES OF A WELDER

[75] Inventors: Gregory Swaggerty, Knoxville, Tenn.; Vaughan Seel, Hudson, Ohio

[73] Assignee: CSI Technology, Inc., Wilmington, Del.

[21] Appl. No.: 08/957,195

[22] Filed: Oct. 24, 1997

[51] Int. Cl.[7] ................................ B23K 9/12; B23K 9/10
[52] U.S. Cl. ........................................ 219/86.41; 219/109
[58] Field of Search .................................... 219/109, 110, 219/86.41, 86.33

[56] References Cited

U.S. PATENT DOCUMENTS

| | | | |
|---|---|---|---|
| 4,472,620 | 9/1984 | Nied | 219/109 |
| 4,497,994 | 2/1985 | Flemm et al. | 219/109 |
| 5,169,052 | 12/1992 | Kaminski | 228/9 |
| 5,266,772 | 11/1993 | Reed | 219/137 R |
| 5,285,043 | 2/1994 | Smith | 219/87 |
| 5,329,092 | 7/1994 | Weaver | 219/124.34 |
| 5,376,766 | 12/1994 | Higgins | 219/109 |
| 5,393,950 | 2/1995 | Killian | 219/110 |
| 5,397,872 | 3/1995 | Baker et al. | 219/109 |
| 5,484,986 | 1/1996 | Fantazian et al. | 219/86.41 |
| 5,504,299 | 4/1996 | Heckendorn | 219/109 |
| 5,532,453 | 7/1996 | Sheller | 219/127 |
| 5,545,872 | 8/1996 | Nakajima et al. | 219/89 |
| 5,558,785 | 9/1996 | Killian et al. | 219/110 |
| 5,575,934 | 11/1996 | Takakuwa | 219/109 |
| 5,582,747 | 12/1996 | Sakai et al. | 219/86.41 |

*Primary Examiner*—Patrick Ryan
*Assistant Examiner*—Anjan Dey
*Attorney, Agent, or Firm*—Luedeka, Neely & Graham, P.C.

[57] ABSTRACT

A system and method for monitoring compression pressure, temperature, and alignment of first and second electrodes of a robotic welder. An apparatus is provided with hingedly connected, spaced apart top and bottom plates. An aperture is disposed in the top plate for receiving the first electrode therein and an aperture is disposed in the bottom plate for receiving the second electrode therein. Temperature sensors are mounted adjacent to the top and bottom plates for sensing temperature of the electrodes. A load cell is included in the apparatus for sensing pressure between the electrodes as well as a limit switch for indirectly sensing misalignment between the electrodes. A data processing unit is in electrical communication with the temperature sensors, load cell, and limit switch for performing software analysis.

26 Claims, 4 Drawing Sheets

US 6,084,195

SYSTEM AND METHOD FOR MONITORING ELECTRODES OF A WELDER

BACKGROUND

1. Field of the Invention

In general, the present invention relates to electrodes of welders, and in particular, the present invention relates to a system and method for monitoring alignment, pressure, and temperature of electrodes of a welder.

2. Description of the Related Art

Under current practices, technicians typically enter an industrial setting at a predetermined time and measure certain parameters of robotic welders such as electrode temperature, compression pressure, and alignment. These adjustments are usually done manually, and may have inaccuracies and inconsistencies due to human error. Moreover, because these routine monitoring events typically take place at set time intervals, if an electrode anomaly occurs after monitoring, there is no problem recognition until the next scheduled maintenance. It would therefore be desirable to have a system and method that accurately monitors the temperature, compression pressure, and alignment of electrodes of a welder on a regular basis and will alert a service technician immediately if an anomaly relating to the temperature, pressure, or alignment of the electrodes of the welder has occurred.

SUMMARY OF THE INVENTION

The present invention eliminates the above oversights, difficulties, and disadvantages of the prior art by providing a system and method for monitoring first and second electrodes of a welder. The system includes an apparatus with connectedly spaced apart top and bottom plates. An aperture is disposed in the top plate for receiving the first electrode therein and an aperture is disposed in the bottom plate for receiving the second electrode therein. Temperature sensors are mounted adjacent to the top and bottom plates for sensing temperature of the first and second electrodes, respectively. A data processing unit is in electrical communication with the temperature sensors for monitoring and determining whether the temperature of the first and second electrodes exceeds a threshold value.

In another embodiment of the present invention, a load cell is attached to the bottom plate and is in axial alignment with the apertures disposed in the top and bottom plates. The load cell is contacted by the first and second electrodes for sensing compression pressure between the first and second electrodes. A data processing unit is in electrical communication with the temperature sensors, load cell, and limit switch. The data processing unit monitors and determines whether the compression pressure of the first and second electrodes exceeds a threshold value.

A further embodiment of the present system includes a limit switch that is mounted on the bottom plate. The limit switch is activated when either of the first or second electrodes contacts the top and bottom plates, respectively, thereby denoting misalignment. A data processing unit is in electrical communication with the limit switch. The data processing unit monitors and determines whether alignment of the first and second electrodes exceeds a threshold value.

Other objects, features and advantages of the present invention will become apparent by reference to the following detailed description of a preferred embodiment when considered in conjunction with the accompanying drawings.

DESCRIPTION OF THE PREFERRED EMBODIMENT

Figure 1:
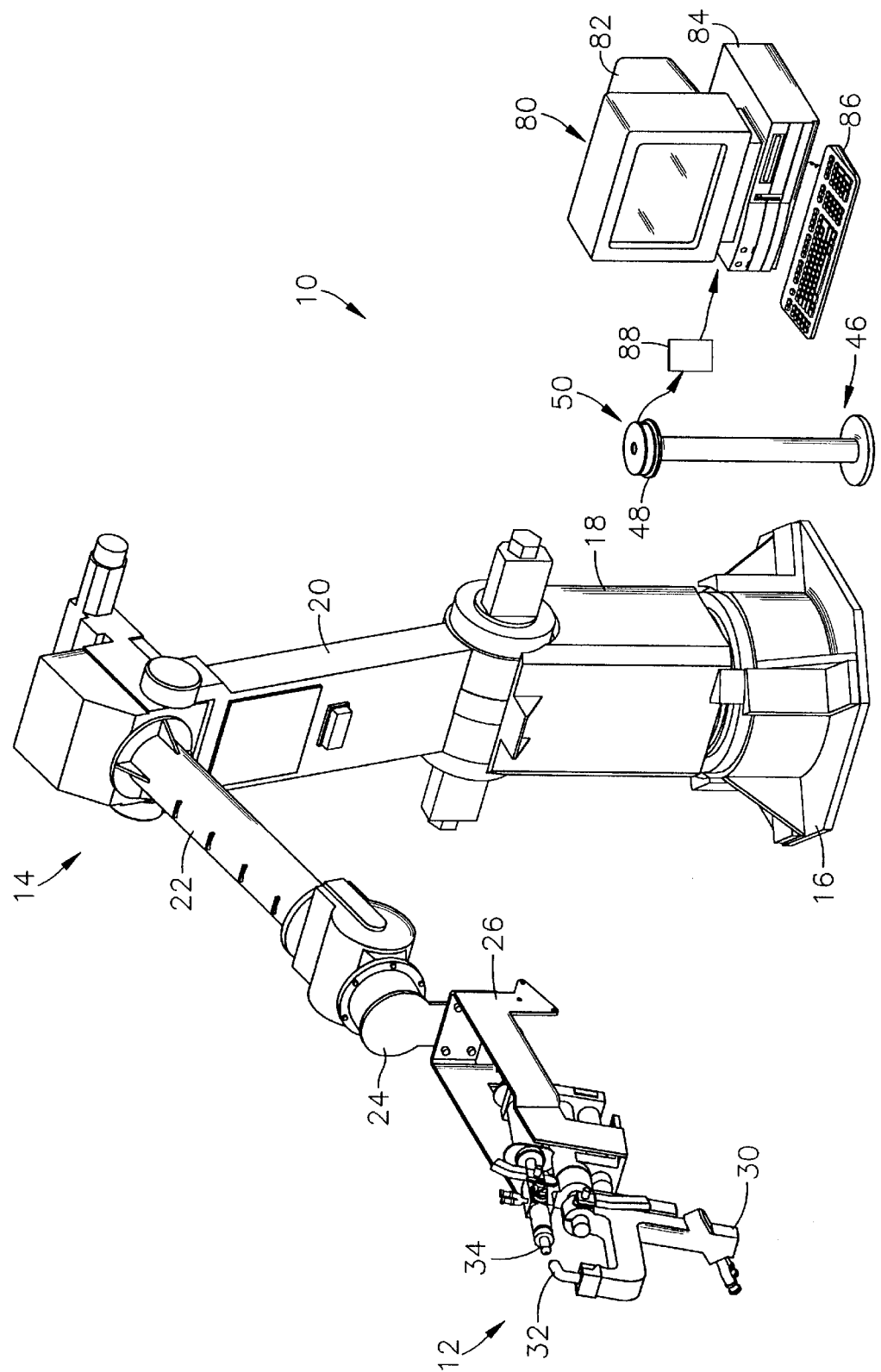
FIG. 1 is a perspective view of a robotic welder of the present invention.

Commencing with FIG. 1, a system 10 for monitoring a pair of electrodes 12 of a welder 14 is shown. The welder 14 is preferably a resistance welder and includes a base 16 on which is a swivelably mounted member 18. Hingedly attached to member 18 is an extension member 20 that is attached to boom arm 22. Rotatably coupled to the boom arm 22 is a breakaway device 24, which is attached to a gun mounting bracket 26. Secured to the mounting bracket 26 is a welding gun 30 that includes the pair of electrodes 12 and has a first electrode 32 and a second electrode 34. In operation of the robotic welder 14, sheets of material are typically placed between the first and second electrodes, 32 and 34, and a flow of current is transferred between the electrodes whereby an electrically conductive path is created by the contact of the electrodes, 32 and 34, with the pieces of material.

Figure 2:
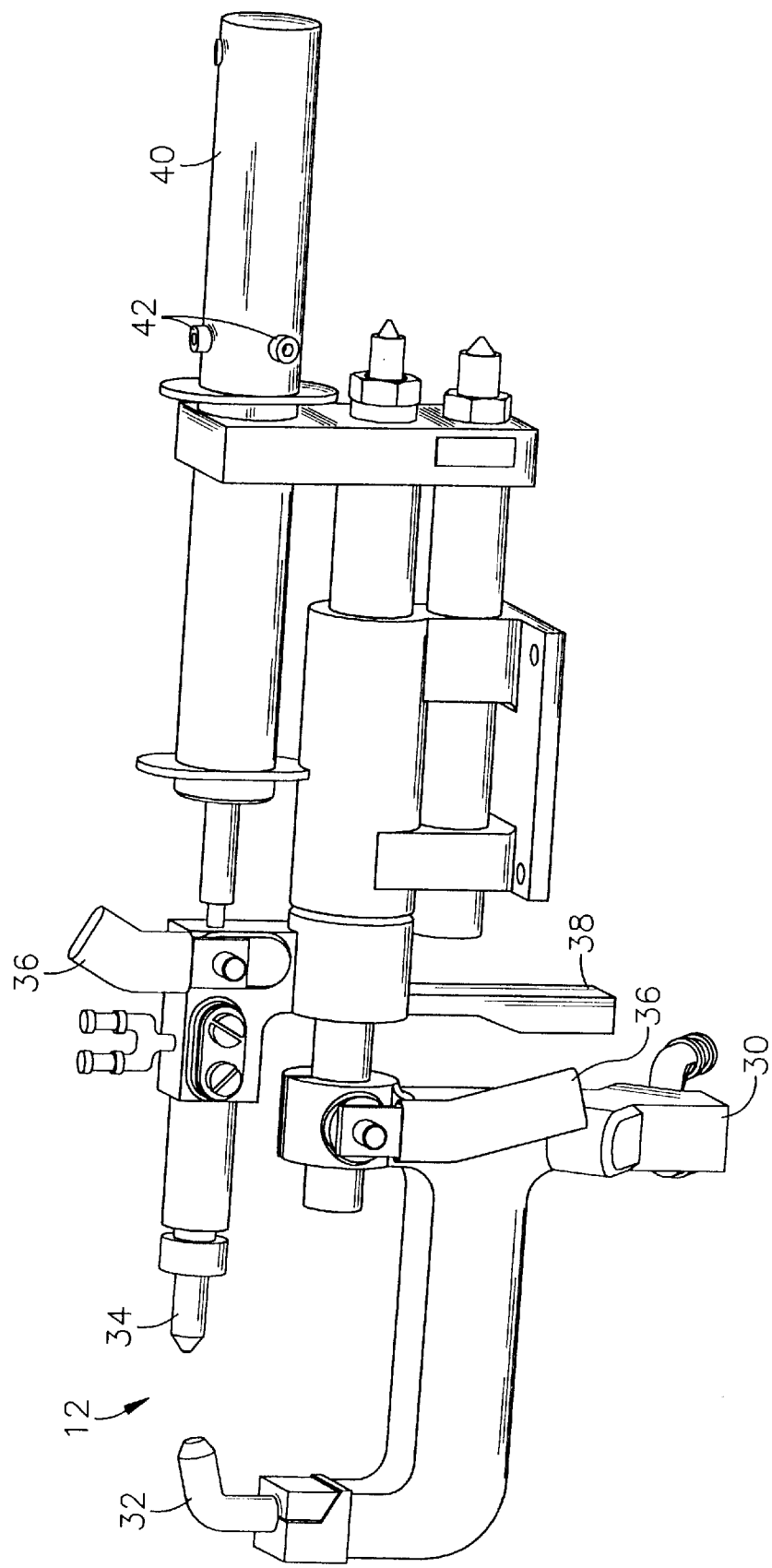
FIG. 2 is a perspective view of first and second welding electrodes of the present invention.

As is best shown in FIG. 2, the welding gun 30 further includes a weld cable 36 attached thereon as well as a mounting face 38. The welding gun 30 further includes a cylinder 40 and cylinder ports 42. The cylinder 40 allows for a flow of liquid into the first and second electrodes, 32 and 34, for cooling the temperature of the electrodes.

Figure 3:
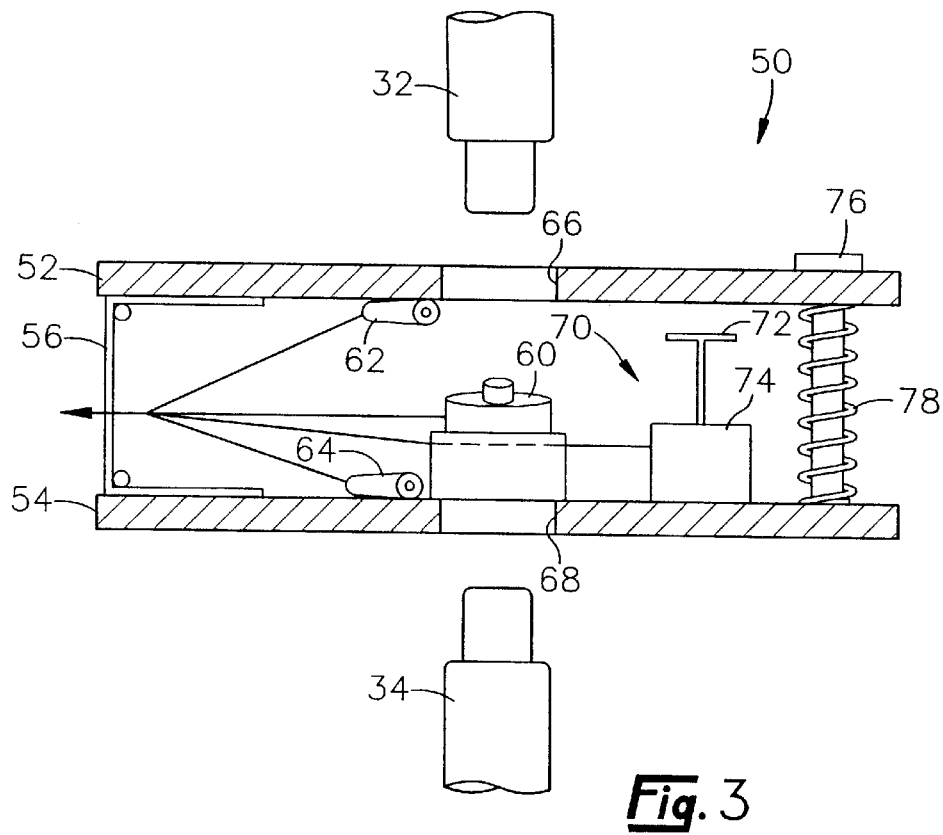
FIG. 3 is a side elevational view of an electrode monitoring apparatus of the present invention.

Referring now to FIGS. 1 and 3, an electrode monitoring apparatus 50 for sensing temperature, alignment, and compression pressure of the first and second electrodes, 32 and 34, is shown. The apparatus 50 includes a top plate 52 that is connectedly spaced apart from a bottom plate 54. Preferably, the top and bottom plates, 52 and 54, are circular or oval in shape and the plates are hingedly connected by hinge 56. Disposed in the top plate 52 is an aperture 66 for receiving one of the first and second electrodes, 32 and 34. Similarly, disposed in the bottom plate 54 is an aperture 68 for also receiving one of the first and second electrodes, 32 and 34. Preferably, aperture 66 that is disposed in the top plate 52 receives the first electrode 32 therein and aperture 68 that is disposed in the bottom plate 54 receives the second electrode 34 therein. Also preferably, the apertures 66 and 68 are located in the center of the top plate 52 and bottom plate 54, respectively.

Temperature of the first and second electrodes, 32 and 34, is typically regulated by a liquid that flows within the electrodes as discussed above. The temperature of the first and second electrodes, 32 and 34, is ideally less than or equal to 80° F. which is the ambient temperature of the cooling fluid. The electrode monitoring apparatus 50 further includes a temperature sensor 62 that is preferably mounted adjacent to the top plate 52 for sensing temperature of the first electrode 32 when inserted through aperture 66 in the top plate 52. The temperature sensor 62 could also be secured to the top plate 52. The apparatus 50 further includes a temperature sensor 64 that is preferably mounted adjacent to the bottom plate 54 for sensing temperature of the second electrode 34 when inserted through aperture 68 that is disposed in the bottom plate 54. The temperature sensor 64 could also be secured to the bottom plate 54. Preferably the temperature sensors 62 and 64 are OMEGA Corporation sensors having Model No. 0S36.

Compression pressure of the electrodes, 32 and 34, determines how tightly or loosely the sheets of materials will be held between the electrodes. If the pressure between the first and second electrodes, 32 and 34, is too great, indentations or deformation may occur in the pieces of material. If, however, the pressure between the first and second electrodes, 32 and 34, is too loose, the pieces of material may not be held securely between the electrodes. The electrode monitoring apparatus 50 further includes a load cell 60 attached to the bottom plate 54 and in axial alignment with the apertures 66 and 68 disposed in the top and bottom plates 52 and 54, respectively. The load cell 60 is contacted by the first and second electrodes, 32 and 34. The load cell then senses the compression pressure between the first and second electrodes, 32 and 34. Preferably, the load cell is model LCGD made by OMEGA Corporation.

Proper axial alignment between the first and second electrodes, 32 and 34, is also crucial to the welding process. If the tips are not axially aligned, proper current flow may not occur between the electrodes. Moreover, the pieces of material disposed between the first and second electrodes, 32 and 34, may not be held correctly if alignment of the electrodes is not axial. Therefore, the electrode monitoring apparatus 50 also includes a preferably precision snap-action limit switch 70, which is mounted on the bottom plate 54 that is "tripped" when the electrodes are not aligned by one of the electrodes coming in contact with the top or bottom plate. The limit switch 70 is activated when either of the first and second electrodes, 32 and 34, contact the top and bottom plates, 52 and 54, respectively, thereby causing the plunger 72 to be contacted with the top plate 52. The limit switch 70 includes a base 74 that is mounted to the bottom plate 54 and to which is attached a plunger 72. A voltage will be created across the limit switch 70 if the plunger 72 is pressed by the top plate 52 and this voltage can be detected as discussed below.

Figure 4:
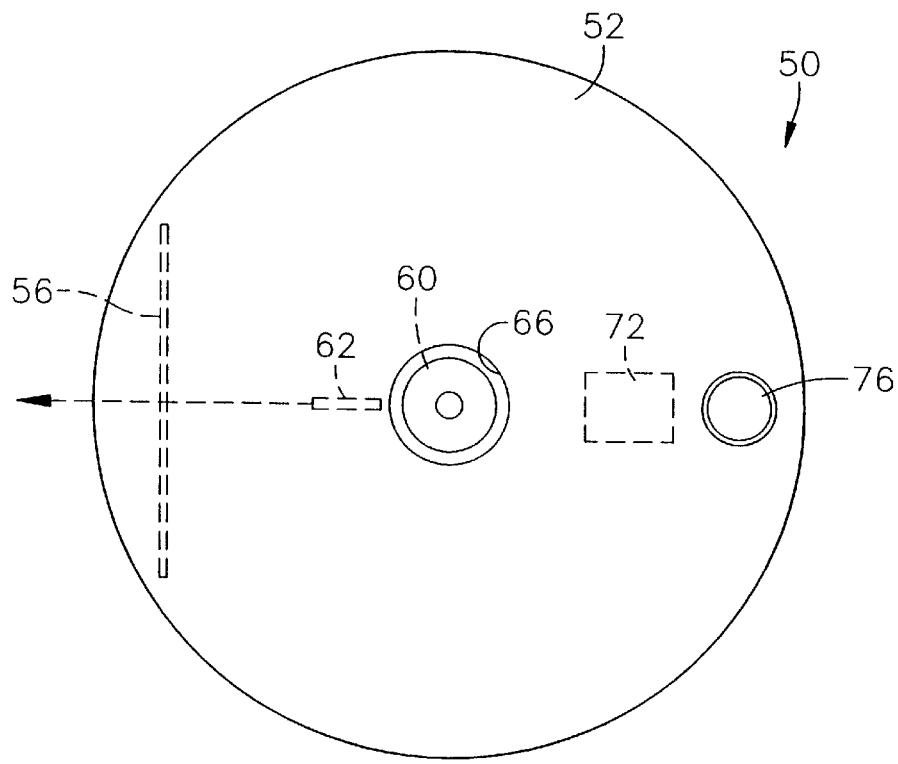
FIG. 4 is a plan view of the electrode monitoring apparatus of the present invention.

The apparatus 50 further includes a stop member 76 that is mounted to the bottom plate 54 at a first end and extends through the top plate 52 at a second end. The stop member 76 includes a spring 78 coiled around the stop member and which is disposed between the first and second ends. The stop member 76 prevents contact of the top plate 52 with the load cell 60. As shown in FIGS. 3 and 4, the hinge 56 allows the top and bottom plates, 52 and 54, to close together if the first and second electrodes, 32 and 34, abut against the top and bottom plates, 52 and 54, if axial misalignment should occur between the electrodes such that one of the plates is contacted.

Referring back to FIG. 1, the present system 10 further includes a peak hold and reset circuit 88 that is in electrical communication with data communication lines 120 of apparatus 50, and stores peak voltage readings, of the first and second temperature sensors, 62 and 64, the load cell 60, and limit switch 70. The output of the peak hold and reset circuit 88 is fed to a data processing unit 80 and allows for multiplexing a plurality of welders into one data processing unit. The present invention thus includes a polling system whereby a single data processing unit 80 can be used to poll multiple peak and hold circuits 88 at set time intervals. It is understood, however, that the first and second temperature sensors, 62 and 64, the load cell 60, and limit switch 70 could be directly connected to the data processing system 80. The data processing unit 80 includes memory (volatile and non-volatile), bus lines (address, control, and data), and other hardware, firmware, and software required to perform the task of data manipulation. Included with the data processing unit 80 is a display monitor 82, which sits on a central processing unit 84 to which is connected a keyboard 86.

The data processing unit 80 monitors the electrical signals from the first and second temperature sensors, 62 and 64, in the preferred embodiment. If the temperature of either of the first and second electrodes, 32 and 34, exceeds 100° F., the data processing unit 80 determines that there is insufficient cooling of the electrodes and can notify a technician via visual, audible, or tactile feedback means. Preferably data processing unit 80 produces a temperature alarm signal on lines 120 when the temperature of sensor 32 or 34 exceeds 100° F. and in response to the alarm signal, an indicator flashes a light or sounds a buzzer, and monitor 82 indicates which electrode (32 or 34) is hot.

Because data processing unit 80 is in electrical communication with the limit switch 70, the unit 80 can monitor and determine whether alignment of the first and second electrodes, 32 and 34, exceeds a threshold value. If the limit switch 70 is tripped, or contacted by the upper plate 52, a positive voltage will appear across the limit switch 70 and be detected by the data processing unit 80. If this occurs, the data processing unit 80 alerts the technician of a misalignment between the first and second electrodes 32 and 34 by a display on monitor 82, lighting an indicator, or sounding an indicator. The data processing system 80 further monitors the electrical signal sent from the load cell 60 and determines whether the pressure of the first and second electrodes, 32 and 34, exceeds a threshold value. If such is the case, the data processing unit 80 notifies the technician of a pressure anomaly between the first and second electrodes 32 and 34. As shown in FIG. 3, the present system 10 also includes a retention member 46 upon which mount 48 is fixedly secured. Attached to mount 48 is a bracket 116 that is secured to hinge 56 thereby positioning apparatus 50 at a fixed Cartesian coordinate in space. Welder 14 is computer controlled and programmed, via Cartesian coordinates, to engage apparatus 50 at a set location and after a predetermined number of welds.

Figure 5:
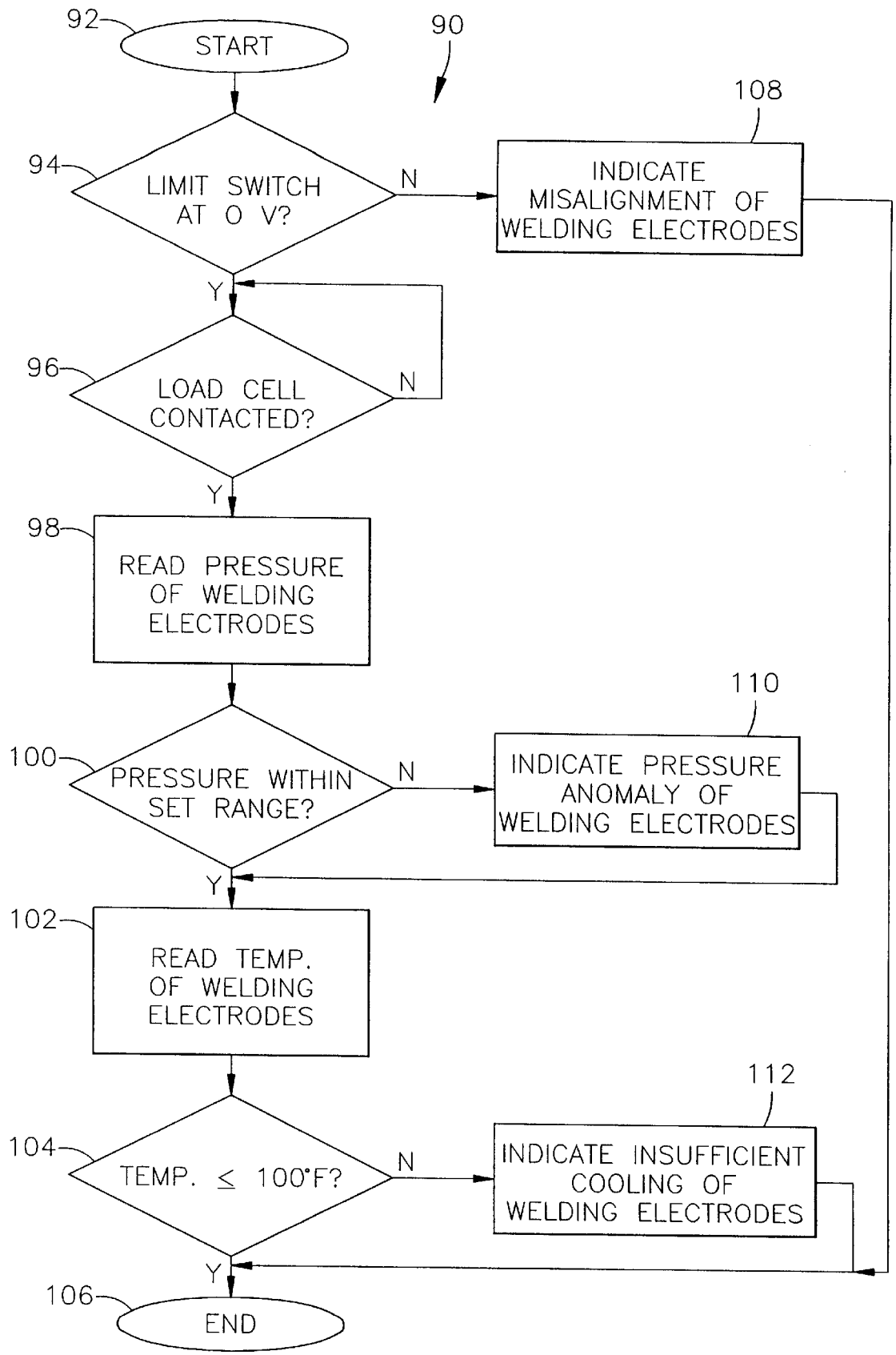
FIG. 5 is a flow chart showing method steps of the present invention.

Referring now to FIG. 5, a method 90 of the present invention is shown and starts or begins in oval 92. The method falls to decision block 94 where it is determined whether the limit switch 70 is at 0 volts. If the limit switch 70 is not at 0 volts, the method 90 determines that a misalignment has occurred between the first and second welding electrodes, 32 and 34, and indicates this misalignment in block 108. The method 90 then falls to oval 106 and ends. If, however, in decision block 94 it is determined that limit switch is at 0 volts, the method 90 falls to decision block 96 whereby it is determined whether the load cell 60 has been contacted. If the load cell 60 has not been contacted by the first and second electrodes, 32 and 34, the method 90 loops back to the top of decision block 96. If, however, it is determined that the load cell 60 has been contacted, the method falls to task block 98 and reads the compression pressure of the first and second electrodes, 32 and 34. The method 90 next falls to decision block 100 whereby it is determined whether the compression pressure of the electrodes is within a set range. Depending upon the set pressure range input to the data processing unit 80, if the method 90 determines that the pressure of the electrodes is not within this range, task block 110 indicates this pressure anomaly and then the method 90 falls to block 102. If the compression pressure of the electrodes is determined by method 90 to be within the set range in decision block 100, the method falls to task block 102 whereby the temperature of the first and second electrodes, 32 and 34, is read by temperature sensors 62 and 64, respectively. The method 90 next falls to decision block 104 whereby it is determined whether the temperature of the electrodes is less than or equal to 100° F. If the temperature of the electrodes is not less than or equal to 100° F., then the method 90 moves to task block 112 and indicates insufficient cooling of the first and second electrodes, 32 and 34. The method 90 then falls to oval 106 and ends. Moreover, if it is determined in decision block 104 the temperature of the electrodes is less than or equal to 100° F., the method 90 falls to oval 106 and ends.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. An apparatus for monitoring first and second electrodes of a welder comprising:
    connectedly spaced apart top and bottom plates;
    an aperture disposed in the top plate for receiving the first electrode therein;
    an aperture disposed in the bottom plate for receiving the second electrode therein;
    a temperature sensor mounted adjacent to the top plate for sensing temperature of the first electrode;
    a temperature sensor mounted adjacent to the bottom plate for sensing temperature of the second electrode; and
    a data processing unit in electrical communication with the temperature sensors for monitoring and determining whether the temperature of the first and second electrodes exceeds a threshold value.

2. The apparatus of claim 1 further including a load cell attached to the bottom plate and in axial alignment with the apertures disposed in the top and bottom plates, the load cell being contacted by the first and second electrodes for sensing compression pressure between the first and second electrodes.

3. The apparatus of claim 1 further including a limit switch mounted on the bottom plate, the limit switch being activated when either of the first and second electrodes contacts the top and bottom plates, respectively, thereby denoting misalignment.

4. The apparatus of claim 1 further including a stop member mounted on the bottom plate at a first end and extending through the top plate at a second end, the stop member including a spring coiled around the stop member and disposed between the first and second ends, and whereby the stop member prevents contact of the top plate with the bottom plate.

5. The apparatus of claim 1 wherein the top and bottom plates are spaced apart and hingedly connected.

6. The apparatus of claim 2 wherein the data processing unit is in electrical communication with the load cell for monitoring and determining whether the compression pressure of the first and second electrodes exceeds a corresponding threshold value.

7. The apparatus of claim 3 wherein the data processing unit is in electrical communication with the limit switch for monitoring and determining whether the alignment of the first and second electrodes exceeds a corresponding threshold value.

8. The apparatus of claim 1 further including a peak and hold circuit in electrical communication with the data processing unit and the temperature sensors for storing peak voltage of the temperature sensors.

9. A system for monitoring compression pressure of first and second electrodes of a welder, the system comprising:
    an apparatus comprising:
        connectedly spaced apart top and bottom plates,
        an aperture disposed in the top plate for receiving the first electrode therein,
        an aperture disposed in the bottom plate for receiving the second electrode therein, and
        a load cell attached to the bottom plate and in axial alignment with the apertures disposed in the top and bottom plates, the load cell being contacted by the first and second electrodes for sensing compression pressure between the first and second electrodes; and
    a data processing unit in electrical communication with the load cell for monitoring and determining whether the compression pressure of the first and second electrodes exceeds a threshold value.

10. The system of claim 9 wherein the apparatus further includes a temperature sensor mounted adjacent to the top plate for sensing temperature of the first electrode, and a temperature sensor mounted adjacent to the bottom plate for sensing temperature of the second electrode.

11. The system of claim 9 wherein the apparatus further includes a limit switch mounted on the bottom plate, the limit switch being activated when either of the first and second electrodes contacts the top and bottom plates, respectively, thereby denoting misalignment.

12. The system of claim 9 wherein the apparatus further includes a stop member mounted on the bottom plate at a first end and extending through the top plate at a second end, the stop member including a spring coiled around the stop member and disposed between the first and second ends, and whereby the stop member prevents contact of the top plate with the load cell.

13. The system of claim 9 wherein the top and bottom plates are spaced apart and hingedly connected.

14. The system of claim 10 wherein the data processing unit is in electrical communication with the temperature sensors for monitoring and determining whether the temperature of the first and second electrodes exceeds a threshold value.

15. The system of claim 11 wherein the data processing unit is in electrical communication with the limit switch for monitoring and determining whether the alignment of the first and second electrodes exceeds a threshold value.

16. The system of claim 9 further including a peak and hold circuit in electrical communication with the data processing unit and the load cell for storing peak voltage of the load cell.

17. A system for monitoring alignment of first and second electrodes of a welder, the system comprising:
    an apparatus comprising:
        connectedly spaced apart top and bottom plates,
        an aperture disposed in the top plate for receiving the first electrode therein,
        an aperture disposed in the bottom plate for receiving the second electrode therein, and
        a limit switch mounted on the bottom plate, the limit switch being activated when either of the first and second electrodes contacts the top and bottom plates, respectively, thereby denoting misalignment; and
    a data processing unit in electrical communication with the limit switch for monitoring and determining whether alignment of the first and second electrodes exceeds a threshold value.

18. The system of claim 17 wherein the apparatus further includes a temperature sensor mounted adjacent to the top plate for sensing temperature of the first electrode, and a temperature sensor mounted adjacent to the bottom plate for sensing temperature of the second electrode.

19. The system of claim 17 wherein the apparatus further includes a load cell attached to the bottom plate and in axial alignment with the apertures disposed in the top and bottom plates, the load cell being contacted by the first and second electrodes for sensing compression pressure between the first and second electrodes.

20. The system of claim 17 wherein the apparatus further includes a stop member mounted on the bottom plate at a first end and extending through the top plate at a second end, the stop member including a spring coiled around the stop member and disposed between the first and second ends, and whereby the stop member prevents contact of the top plate with the load cell.

21. The system of claim 17 wherein the top and bottom plates are hingedly connected.

22. The system of claim 18 wherein the data processing unit is in electrical communication with the temperature sensors for monitoring and determining whether the temperature of the first and second electrodes exceeds a threshold value.

23. The system of claim 19 wherein the data processing unit is in electrical communication with the load cell for monitoring and determining whether the compression pressure of the first and second electrodes exceeds a threshold value.

24. The system of claim 17 further including a peak and hold circuit in electrical communication with the data processing unit and the limit switch for storing peak voltage of the limit switch.

25. A method for monitoring temperature, compression pressure, and alignment of first and second electrodes of a welder, the method comprising the steps of:

determining whether the first and second electrodes are in alignment and, if not, indicating misalignment;

compressing a load cell between the first and second electrodes to produce a load cell signal;

comparing the load cell signal to criteria and determining whether the compression pressure of the first and second electrodes is within a set range;

indicating an anomaly of the compression pressure between the first and second electrodes if the compression pressure is not within the set range;

determining temperature of the first and second electrodes; and indicating insufficient cooling of the first and second electrodes if temperature of the first and second electrodes is greater than a threshold temperature.

26. The method of claim 25 wherein the threshold temperature is 100° F.

* * * * *